3,017,259
CALCIUM CARBIDE PROCESS
Du Bois Eastman, Whittier, Calif., assignor to Texaco Inc., a corporation of Delaware
Filed June 24, 1958, Ser. No. 744,159
6 Claims. (Cl. 48—216)

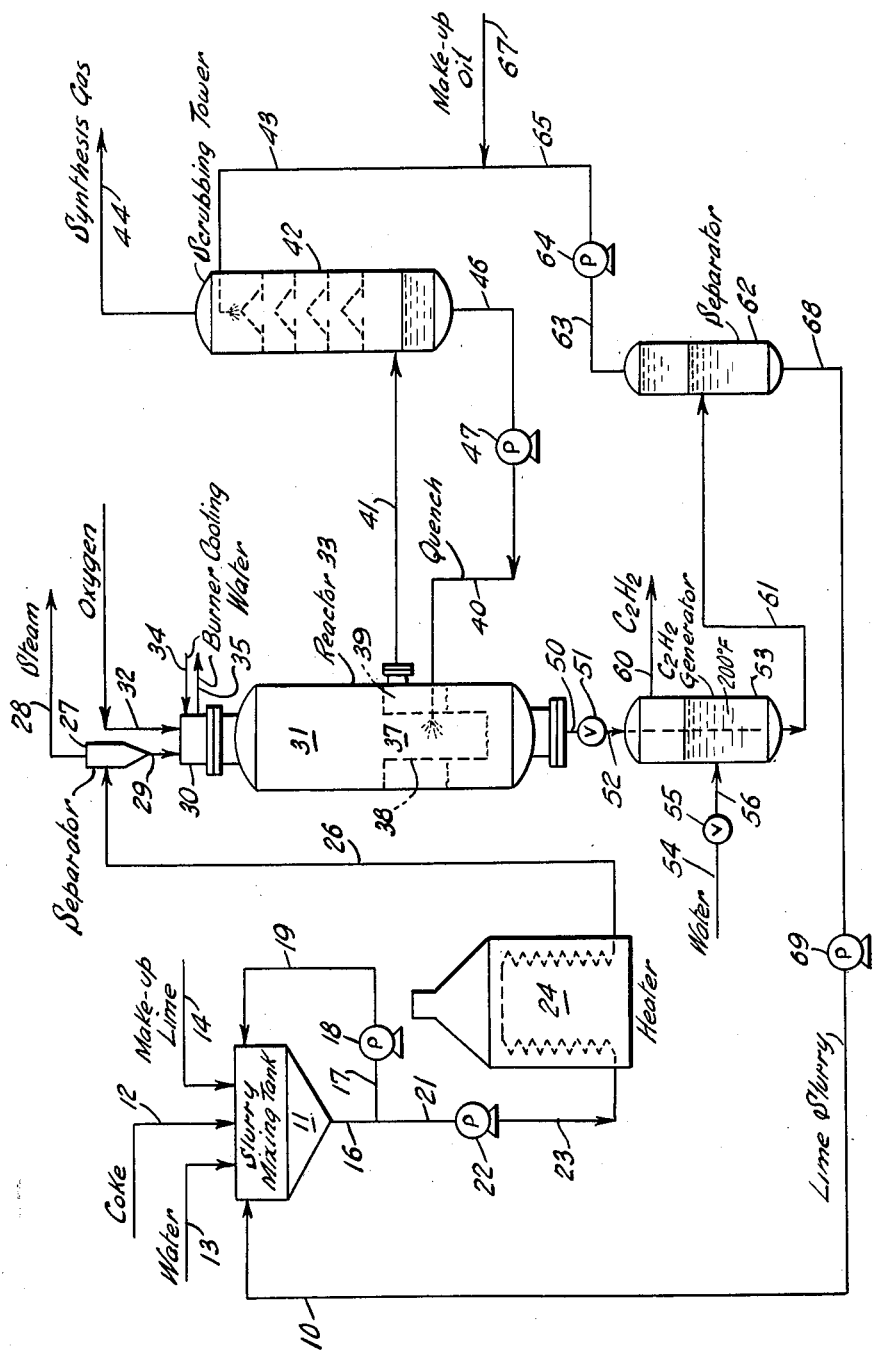

This invention relates to a method and apparatus for the manufacture of acetylene. In one of its more specific aspects, it is directed to a process wherein steam, carbonaceous fuel, oxygen and calcareous solid in the form of a gaseous suspension are reacted in a flow type gas generator to form calcium carbide, carbon monoxide, and hydrogen, the aforesaid products are cooled in contact with a liquid hydrocarbon said calcium carbide is separately withdrawn as a solid reaction product suspended in said liquid hydrocarbon and said carbon monoxide and hydrogen are withdrawn as a gaseous product.

Calcium carbide is usually prepared by heating a mixture of pulverized lime and coke in an electric furnace. The electric furnace is employed to provide the necessary high temperature for large scale operation. Recently, attempts have been made to produce calcium carbide by processes wherein the high temperature required is generated by reacting carbon and oxygen in a shaft furnace in contact with lime. U.S. Patent 2,738,256, issued to Willem Van Loon, March 13, 1956, describes a process in which a mixture of lumps of fuel and limestone is introduced into the top of a shaft furnace and oxygen is introduced through tuyeres to produce molten calcium carbide.

In accordance with this invention, a carbonaceous compound and a calcareous compound are reacted with oxygen and steam at high temperatures in a reaction system wherein solid reactants and reaction products are suspended and entrained in gaseous reactants and reaction products. The process results in concomitant production of calcium carbide and a synthesis gas product comprising carbon monoxide and hydrogen. In one embodiment of the process of this invention a flowable mixture comprising a slurry of lime, coke and water is formed. Said mixture is forced through a heating zone wherein it is heated to a temperature above the boiling point of water at the pressure existing in said zone to effect vaporization of said water and formation of a dispersion of particles of lime and coke in steam. This results in an intimate mixture of the lime and powdered carbon. The dispersion so formed, is passed in admixture with oxygen into a reaction zone autogenously maintained at a reaction temperature of about 4500° F. The lime, coke, steam, and oxygen are reacted in said reaction zone to form liquid calcium carbide and gaseous products comprising carbon monoxide and hydrogen. The aforesaid reaction products are quenched to a temperature below about 6000° F. by contact with a spray of hydrocarbon oil. The cooled reaction products comprising solid calcium carbide and a product gas comprising carbon monoxide and hydrogen are passed through an oil scrubbing zone to separate the solid calcium carbide as a slurry in oil from the gaseous products which are separately withdrawn. The gaseous product comprising hydrogen and carbon monoxide, commonly referred to as synthesis gas, is suitable for many uses, for example, for the manufacture of ammonia, synthetic hydrocarbons, heating gas and chemical synthesis.

The calcium carbide-oil slurry is contacted with water to effect conversion of said calcium carbide to acetylene and lime and to effect transfer of the lime from the oil phase into the water phase to form a water slurry. The water slurry of lime is recycled to serve as at least a part of the lime and water employed in forming the slurry feed to the process. Oil, substantially free of solid calcium carbide and lime, is separated and recycled to form at least a part of the oil employed to quench and scrub the reaction products.

In the slurry feed system described above, vaporization of the liquid component of the slurry results in a great increase in volume which, in turn, greatly increases the velocity of flow in the tubular heating zone. The dispersion of solid particles in vapor flows through the heating zone in highly turbulent flow. Under turbulent flow conditions, the solid particles are subjected to numerous collisions with one another and with the wall of the pipe, at velocities of 30 feet per second or higher in half inch tubing pulverization of the solid particles result. Pulverization increases the surface as well as the ratio of surface to mass of the solid reactant with resultant increase in reaction rate and improved utilization of the solid reactant in the carbide producing reaction zone. At higher velocities or with greater turbulence, the extent of pulverization is increased.

The heating step may be carried out most effectively in a tubular heater, for example, a coil of pipe or a pipe-still type furnace. The slurry is fed into the heating zone, or heated tube, at a rate at least sufficient to prevent settling of the solid particles. The linear velocity of the slurry at the inlet to the heating zone should be in excess of about ½ foot per second, preferably in excess of 1 foot per second, and may range as high as 10 feet per second. The velocity of the gaseous dispersion of powdered solid in steam, resulting on vaporization, depends upon the pressure and temperature to which the dispersion is subjected, as well as the rate at which slurry is supplied to the heating zone. The velocity of the gaseous dispersion increases as the dispersion approaches the outlet of the heating zone, due to the gradually decreasing pressure. The difference in pressure between the inlet and the outlet of the heating zone may, for example, amount to 100 pounds per square inch or more. Preferably a velocity above about 60 feet per second is attained within the heating zone. Much higher velocities, for example, velocities of the order of 2,000 to 3,000 feet per second, may be obtained in this process. Generally, as the velocity is increased, the degree of pulverization is increased. Maximum velocities of the gasiform dispersion of powdered solid and vapor, and maximum pulverization, other conditions being equal, result when a relatively low pressure is maintained at the outlet of the heating zone.

Calcareous materials suitable for use in the process of this invention are for example, limestone, dolomite, slaked lime and unslaked lime. The word "lime" is used in describing this invention in detail, but it is to be understood that any of the foregoing calcareous materials and the like may be employed. Carbonaceous compounds suitable for use in the process of this invention include, for example, coke, coal of various grades and hydrocarbon oils, for example, distillates, residues, pitches etc. Since the foregoing carbonaceous compounds are usually employed as fuel for their heating value, the terms "carbonaceous fuel" or simply "fuel" are used herein for convenience to refer to carbonaceous compounds generally.

When solid carbonaceous fuels are employed, advantageously the slurry of lime and fuel is prepared with water. However, when liquid hydrocarbons are employed as part or all of the carbonaceous component of the feed, the liquid hydrocarbon may serve as a part or all of the slurrying medium to disperse the solid lime. When water is employed as the sole liquid component of the slurry, the dispersion formed upon heating comprises solid particles of fuel and lime dispersed in steam. When a liquid hydrocarbon is employed as a part of the carbonaceous feed and slurrying medium, the dispersion formed upon heating may comprise solid particles of lime in hydrocarbon vapor or solid particles of lime and liquid particles of oil in oil vapor. When mixtures of oil and water are employed as the liquid component of the slurry, the dispersion formed upon heating may comprise solid particles of lime in an admixture of oil and water vapor, solid particles of lime and liquid particles of oil in an admixture of oil and water vapor or solid particles of lime and liquid particles of oil in steam. When water is employed as slurrying medium, and it is desired to reduce the amount of steam passed to the reaction zone to an amount less than that required to form a flowable mixture in the slurry feed system, a portion of the steam may be separated from the dispersion of solid particles by passing the dispersion through a gas-solids separator, for example, a cyclone separator.

Since a large part of the carbonaceous fuel and oxygen passed to the reaction zone are employed to supply heat thereto, it is desirable to exclude diluents from the reaction zone, and it is preferable, therefore, that the oxygen-containing gas to be of high purity. Commercially pure oxygen comprising about 95 percent oxygen is readily obtained by the rectification of air and is a preferred source of oxygen for the process of this invention.

The reaction of steam, fuel, lime and oxygen is effected at temperature within the range of 3000 to 5000° F., preferably at a temperature of about 4500° F. The products of reaction comprise liquid calcium carbide and gaseous products including carbon monoxide and hydrogen. The products are rapidly cooled to a temperature below about 800° F., and preferably below about 600° F. by contact with a spray of a liquid hydrocarbon. Liquid hydrocarbons boiling above the quench temperature are suitable for use in the process of this invention. It is preferred to employ high boiling refractory oils, for example, cycle gas oils from thermal or catalytic cracking of petroleum oils.

Advantageously, the reaction products are passed through a dip leg immersed in the quench oil which effects further contact and scrubbing of the products with the quench oil and separation of the solid calcium carbide from the gaseous products. The gaseous products are then passed through a scrubbing tower where they are contacted in countercurrent flow with cascading oil to separate any remaining entrained solid particles. Solid calcium carbide may be recovered as a product by filtering the solids from the oil slurry, washing the filter cake with a non-aqueous or non-reactive solvent, and drying. In a preferred embodiment of the process of this invention, the oil slurry of calcium carbide is withdrawn to an acetylene generator where it is contacted with water to effect conversion of the calcium carbide to acetylene and lime and to effect transfer of the lime from the oil phase into the water phase to form an aqueous lime slurry. Water is generally used in an amount sufficient to reduce the temperature of the oil slurry from about 600° F. to a suitable temperature for acetylene generation that is below about 300° F. and preferably below about 200° F. The aqueous lime slurry is then returned to the slurry feed preparation step to form the carbonaceous-calcareous slurry employed as feed in the process. Oil from which the solids have been separated is recycled to provide the quench and scrubbing medium employed to cool and separate the solid calcium carbide from the gaseous reaction products.

The use of the slurry feed system of the process of this invention provides a means of introducing the reactants into the carbide reactor at pressures substantially above atmospheric, for example, pressures up to about 600 pounds per square inch gauge. The operation of the reaction zone at high pressure is advantageous in that vessel sizes are reduced and the gaseous products are produced under pressure suitable for use in many applications without further compression. It is generally desirable to operate the acetylene generator at pressures within the range of about atmospheric to 100 pounds per square inch gauge.

An advantage of the process of this invention is that calcium carbide and synthesis gas are concomitantly produced by the reaction of a carbonaceous fuel, a calcareous compound, steam and oxygen.

Another advantage of the process of this invention is that calcium carbide produced in liquid form is solidified by contact with a quench and separated as a slurry of solid calcium carbide in oil.

Another advantage of the process of this invention is that acetylene and an aqueous slurry of lime are formed by contacting an oil slurry of calcium carbide with water which slurry is recycled for reuse in the preparation of additional process feed.

Another advantage of the process of this invention is that reactants are introduced into the reaction zone as a dispersion in vapor thereby effecting efficient contact and high reaction rates.

Another advantage of the process of this invention is that the reactants are readily introduced into the reaction zone under pressure thereby permitting the production of gaseous products at high pressures without further compression.

Another advantage of the process of this invention is that pulverization may be effected in the slurry feed system thereby increasing the reactiveness of the solid reactants.

The accompanying drawing diagrammatically illustrates one form of the process of this invention. Although the drawing illustrates one arrangement of apparatus in which the process of this invention may be practiced, it is not intended to limit the invention to the particular apparatus or material described.

Lime slurry in line 10 is introduced into slurry mixing tank 11. Coke or other carbonaceous fuel is introduced into slurry mixing tank 11 as indicated by line 12. Additional water if necessary is added through line 13. Make up lime, if needed, is added through line 14. The slurry is formed by rapidly circulating the contents of slurry in mixing tank 11 through lines 16 and 17 by pump 18 and discharging back into slurry mixing tank 11 through line 19. A portion of the circulating slurry stream is withdrawn through line 21 and discharged by pump 22 through line 23 to heater 24. In heater 24, the slurry is heated to a temperature at least sufficient to vaporize the water thereby forming a dispersion of solid lime and coke particles in steam. The dispersion of solid particles in steam is discharged from heater 24 through line 26 to separator 27. Separator 27 may be a cyclone separator and is employed to separate a portion of the steam from the dispersion to reduce the amount of steam passed to the reaction zone. Separated steam is discharged through line 28 and the steam dispersion of increased solids concentration is passed through line 29 to burner 30.

In burner 30, the dispersion is contacted with oxygen introduced through line 32 to maintain an autogenous reaction temperature in reaction zone 31 of about 4500° F. Burner 30 is cooled by circulating cooling water through lines 34 and 35. Reaction products pass through quench zone 37 within dip leg 38. Quench oil is sprayed into the quench zone through line 40. Reaction products passing through dip leg 38 are then contacted with oil in the annulus 39 formed between the dip leg 38 and reactor shell 33. In annulus 39, the reaction products are scrubbed with oil thereby forming a slurry of solid calcium carbide particles in oil. Gaseous products separate from the oil in the annulus 39 and are discharged through line 41 to scrubbing tower 42.

The gaseous product comprising carbon monoxide and hydrogen is contacted in countercurrent flow with oil introduced into scrubber 42 through line 43 to separate any remaining entrained solids. Gas, free of solids, is withdrawn from scrubbing tower 42 through line 44 and is discharged for utilization not shown. The scrubbing oil collected in the bottom of tower 42 is withdrawn through line 46 and is transferred by pump 47 and line 40 to quench zone 37 to provide the quench oil therein.

Calcium carbide-oil slurry is withdrawn from reactor 33 through line 50, valve 51 and line 52 to acetylene generator 53. Valve 51 is provided to reduce the pressure between reactor 33 and acetylene generator 53 when reactor 33 is operated at a pressure higher than that desired for the generation of acetylene. Acetylene is generated by introducing water through line 54, valve 55 and line 56 to acetylene generator 53. Acetylene product is withdrawn through line 60 for utilization not shown.

A mixture of oil, water and lime is withdrawn through line 61 and passed to separator 62 wherein an oil phase free of lime is separated from an aqueous phase comprising a slurry of lime and water. The oil phase is withdrawn through line 63 by pump 64 and is charged through lines 65 and 43 to provide the oil charged to scrubbing tower 42. Makeup oil as necessary is introduced through line 67. The aqueous lime slurry is withdrawn from separator 62 through line 68 and is discharged by pump 69 through line 10 to slurry mixing tank 11 for further use in the preparation of additional feed.

*Example*

A slurry comprising 13,160 lbs. per hour of coke, 2,000 lbs. per hour of lime, and 14,000 lbs. per hour of water, is heated to a temperature of 1,000° F. to form a dispersion of solid particles in steam. This dispersion is reacted with 187,600 standard cubic feet per hour of oxygen at a temperature of 4,000° F. and a pressure of 400 p.s.i.g. The reaction products are contacted with a quench oil in sufficient quantity to reduce their temperature to 160° F. A gas comprising 87.5% carbon monoxide and 12.5% hydrogen is separated from the quench and scrubbing oil at a rate of 482,000 standard cubic feet per hour. A slurry stream of quench oil containing 2,280 lbs. per hour of calcium carbide is withdrawn from the quench and scrubbing zone and passed to an acetylene generation zone. In the acetylene generation zone the carbide slurry is reacted with 29.3 gallons per minute of water to generate 920 lbs. per hour or 13,400 standard cubic feet per hour of acetylene. The quench oil is separated from an aqueous lime slurry produced in the acetylene generation zone and recycled as scrubbing and quench medium. Aqueous lime slurry at a rate of 28 gallons per minute, containing 2,000 lbs. per hour of lime, is recycled to provide the water and lime required for the slurry feed.

Obviously, many modifications and variations of the invention as hereinbefore set forth may be made without departing from the spirit and scope thereof and only such limitations should be imposed as are indicated in the appended claims.

I claim:

1. A process for the manufacture of calcium carbide which comprises forming a gaseous suspension comprising steam, a carbonaceous fuel and a calcareous compound, selected from the group consisting of calcium oxide, calcium hydroxide, limestone and dolomite, said suspension containing sufficient calcareous compound and carbonaceous fuel to produce calcium carbide, passing said gaseous suspension into a flow type conversion zone, reacting said steam, said carbonaceous fuel, and said calcareous compound with a gas comprising oxygen at a temperature within the range of about 3000 to 5000° F. to form products comprising liquid calcium carbide and gaseous carbon monoxide and hydrogen; contacting said products with hydrocarbon oil, cooling said products to a temperature below about 800° F. and separately withdrawing solid calcium carbide in suspension in said oil and a stream comprising gaseous carbon monoxide and hydrogen.

2. The process of claim 1 wherein said steam, said carbonaceous fuel, said calcareous compound, and said oxygen are reacted at a temperature of about 4500° F.

3. The process of claim 1 wherein said suspension comprising solid calcium carbide in oil is contacted with water at a temperature below about 300° F. to generate acetylene.

4. The process of claim 3 wherein lime formed by reaction of said calcium carbide and said water is separated in the form of an aqueous slurry and recycled to comprise at least a part of the calcareous compound passed to said conversion zone.

5. A process for the concomitant manufacture of acetylene and synthesis gas which comprises forming a flowable mixture of a carbonaceous fuel, a calcareous compound and water, selected from the group consisting of calcium oxide, calcium hydroxide, limestone and dolomite, said suspension containing sufficient calcareous compound and carbonaceous fuel to produce calcium carbide passing said flowable mixture through a heating zone, effecting vaporization of said water, passing the resulting dispersion of solids in steam through a zone of turbulent flow effecting pulverization of said solids, passing the dispersion of pulverized solids into a conversion zone, reacting said steam, and pulverized solids with a gas comprising oxygen at a temperature within the range of about 3000 to about 5000° F. in a flow-type reaction zone to form products comprising liquid calcium carbide and synthesis gas, contacting said products with a stream of hydrocarbon oil to cool said products to a temperature below about 800° F., forming a suspension of solid calcium carbide in said hydrocarbon oil, separately withdrawing synthesis gas and said suspension, contacting said suspension with water at a temperature below about 300° F. in an acetylene generating zone to form acetylene and lime, forming an aqueous slurry of said lime in said acetylene generation zone, separately withdrawing acetylene and said aqueous slurry of lime from said acetylene generation zone and recycling said aqueous slurry of lime to comprise at least a part of the calcareous compound and water forming said flowable mixture.

6. A process for the manufacture of calcium carbide which comprises forming a gaseous suspension comprising steam, carbonaceous fuel and a calcareous compound selected from the group consisting of calcium oxide, calcium hydroxide, limestone and dolomite, said suspension containing sufficient calcareous compound and carbonaceous fuel to produce calcium carbide; passing said gaseous suspension into a flow-type reaction zone; reacting said steam, said carbonaceous fuel, and said calcareous compound with a gas comprising oxygen at a temperature within the range of about 3000 to 5000° F. in said reaction zone to form products comprising liquid calcium carbide and gaseous carbon monoxide and hydrogen; cooling said liquid calcium carbide to a temperature below about 800° F. by direct contact with a hydrocarbon oil boiling above said quench temperature solidifying said calcium carbide and forming a suspension of solid calcium carbide particles in said oil; and separately withdrawing calcium carbide suspended in said oil and a product gas stream comprising carbon monoxide and hydrogen.

References Cited in the file of this patent

UNITED STATES PATENTS

| | | |
|---|---|---|
| 648,688 | Green | May 1, 1900 |
| 1,971,847 | Baume | Aug. 28, 1934 |
| 1,996,185 | Wulff | Apr. 2, 1935 |
| 2,749,219 | Koopal | June 5, 1956 |
| 2,763,434 | Strausser | Sept. 18, 1956 |
| 2,830,883 | Eastman | Apr. 15, 1958 |
| 2,944,960 | Dickens | July 12, 1960 |
| 2,953,445 | Rummel | Sept. 20, 1960 |